United States Patent
Moritz et al.

(10) Patent No.: US 7,278,136 B2
(45) Date of Patent: Oct. 2, 2007

(54) REDUCING PROCESSOR ENERGY CONSUMPTION USING COMPILE-TIME INFORMATION

(75) Inventors: Csaba Andras Moritz, Amherst, MA (US); Mani Krishna, Northampton, MA (US); Israel Koren, Amherst, MA (US); Osman Sabri Unsal, Amherst, MA (US); Saurabh Chheda, Amherst, MA (US); Raksit Ashok, Amherst, MA (US)

(73) Assignee: University of Massachusetts, Boston, MA (US)

( * ) Notice: Subject to any disclaimer, the term of this patent is extended or adjusted under 35 U.S.C. 154(b) by 424 days.

(21) Appl. No.: 10/191,774

(22) Filed: Jul. 9, 2002

(65) Prior Publication Data

US 2004/0010783 A1    Jan. 15, 2004

(51) Int. Cl.
*G06F 9/45*    (2006.01)
*G06F 12/00*    (2006.01)

(52) U.S. Cl. .................... 717/152; 717/130; 717/140; 711/170

(58) Field of Classification Search ........ 717/151–152, 717/140, 144, 156, 131, 146, 130; 713/300–340; 711/118, 147, 150–153, 167, 117, 123, 129, 711/170, 3
See application file for complete search history.

(56) References Cited

U.S. PATENT DOCUMENTS

| | | | |
|---|---|---|---|
| 5,410,669 A | 4/1995 | Biggs et al. | |
| 5,579,520 A * | 11/1996 | Bennett ....................... | 717/151 |
| 5,630,143 A | 5/1997 | Maher et al. | |
| 5,655,124 A | 8/1997 | Lin | |
| 5,704,053 A | 12/1997 | Santhanam | |
| 5,774,685 A | 6/1998 | Dubey | |
| 5,805,907 A | 9/1998 | Loper et al. | |
| 5,857,104 A | 1/1999 | Natarjan et al. | |
| 5,864,697 A | 1/1999 | Shiell | |
| 5,875,464 A * | 2/1999 | Kirk ........................... | 711/129 |
| 5,933,860 A | 8/1999 | Emer et al. | |
| 5,949,995 A | 9/1999 | Freeman | |
| 5,966,544 A | 10/1999 | Sager | |
| 6,078,745 A * | 6/2000 | De Greef et al. ........... | 717/151 |
| 6,105,139 A | 8/2000 | Dey et al. | |
| 6,219,796 B1 | 4/2001 | Bartley | |
| 6,256,743 B1 | 7/2001 | Lin | |
| 6,272,676 B1 | 8/2001 | Haghighat et al. | |
| 6,334,175 B1 * | 12/2001 | Chih ........................... | 711/170 |

(Continued)

OTHER PUBLICATIONS

The standard performance evaluation corporation. http://www.spec.org, Dec. 2000.

(Continued)

*Primary Examiner*—Mary Steelman
(74) *Attorney, Agent, or Firm*—Fish & Richardson P.C.

(57) ABSTRACT

A method, for use in a processor, includes mapping a first data access having less than a predetermined memory footprint to a first memory area, and mapping a second data access having greater than the predetermined memory footprint to a second memory area. The method may also include compiling computer code, inserting annotations into an intermediate representation of the computer code generated during compiling, propagating the annotations from the intermediate representation to a low-level representation of the computer code generated during compiling, and inserting instructions into the low-level representation, the instructions controlling mapping of the first data and the second data.

22 Claims, 2 Drawing Sheets

U.S. PATENT DOCUMENTS

| | | | |
|---|---|---|---|
| 6,393,520 | B2 | 5/2002 | Yoshikawa et al. |
| 6,412,105 | B1 | 6/2002 | Maslennikov et al. |
| 6,430,693 | B2 | 8/2002 | Lin |
| 6,446,181 | B1 | 9/2002 | Ramagopal et al. |
| 6,487,640 | B1* | 11/2002 | Lipasti ........................ 711/140 |
| 6,529,943 | B1 | 3/2003 | Ohi |
| 6,539,543 | B1 | 3/2003 | Guffens |
| 6,574,740 | B1 | 6/2003 | Odaohhara et al. |
| 6,625,740 | B1 | 9/2003 | Datar et al. |
| 6,658,578 | B1* | 12/2003 | Laurenti et al. ............ 713/324 |
| 6,675,305 | B1 | 1/2004 | Mohammad |
| 6,687,838 | B2 | 2/2004 | Orenstien et al. |
| 6,795,781 | B2 | 9/2004 | Aldridge et al. |
| 6,813,693 | B2* | 11/2004 | Chilimbi ..................... 711/137 |
| 6,826,652 | B1 | 11/2004 | Chauvel et al. |
| 6,971,092 | B1* | 11/2005 | Chilimbi ..................... 717/158 |
| 6,988,183 | B1* | 1/2006 | Wong ......................... 712/208 |
| 2001/0044891 | A1 | 11/2001 | McGrath et al. |
| 2001/0056531 | A1* | 12/2001 | McFarling .................. 712/239 |
| 2002/0116578 | A1* | 8/2002 | Sakai et al. .................. 711/118 |
| 2004/0010679 | A1 | 1/2004 | Moritz et al. |
| 2004/0010782 | A1 | 1/2004 | Moritz et al. |
| 2004/0015923 | A1* | 1/2004 | Hemsing et al. ............ 717/154 |
| 2004/0205740 | A1 | 10/2004 | Lavery et al. |

OTHER PUBLICATIONS

D. Albonesi. Selective Cache Ways: On-Demand Cache Resource Allocation. In Proceedings of the 32nd International Symposium on Microarchitecture (MICRO '99), Haifa, Israel, Nov. 1999. ACM Press.

L. Benini, A. Macii, and M. Poncino. A Recursive Algorithm for Low-Power Memory Partitioning. In Proceedings of the International Symposium on Low-Power Electronics (ISLPED '00), Rapallo, Italy, 2000. ACM Press.

D. Brooks, V. Tiwari, and M. Martonosi. Wattach: A framework for architectural-level power analysis and optimizations. In Proceedings of the 27th International Symposium on Computer Architecture (ISCA '00), Vancouver, Canada, Jun. 2000. ACM Press.

D. Burger and T. D. Austin. The simplescalar tool set, version 2.0. In University of Wisconsin-Madison Computer-Sciences Department Technical Report #1342, Jun. 1997.

D. Chiou, P. Jain, L. Rudolph, and S. Devdas. Application-specific memory management for embedded systems using software-controlled caches. In Proceedings of the 37th Design Automation Conference (DAC'00), Los Angeles, CA, Jun. 2000. ACM Press.

K. D. Cooper and T. J. Harvey. Compiler-controlled memory. In Proceedings of the 8th International Confernece on Architectural Support for Programming Languages and Systems, Oct. 1998.

C. C. Corporation. Compiler writer's guide for the alpha 21264.

S. Furber et al., ARM3 -32b RISC processor with 4 KByte on-chip cache. In Proceedings of the International Conference on VLSI, Elsevier, North Holland, Aug. 1989.

S. Furber, J. Garside, and S. Temple. Power saving features, in Amulet2e. In Power Driven Microarchitecture Workshop at 25th Annual International Symposium on Computer Architecture, Barcelona, Spain, Jun. 1998.

G. Heinrich. Mips r10000 microprocessor's user manual. Second Edition.

http://web.archive.org/web/20020601014716/http://www.spec.org, The Standard Performance Evaluation Corporation, Dec. 2000, accessed Jun. 14, 2004.

D. Albonesi, "Selective Cache Ways: On-Demand Cache Resource Allocation", Proceedings of the 32$^{nd}$ International Symposium on Microarchitecture, Nov. 1999, Haifa, Israel, ACM Press.

L. Benini et al., "A Recursive Algorithm for Low-Power Memory Partitioning", Proceedings of the International Symposium on Low-Power Electronics, 2000, Rapallo, Italy, ACM Press.

Brooks et al., "Wattch: A Framework for Architectural-Level Power Analysis and Optimizations", Proceedings of the 27$^{th}$ International Symposium on Computer Architecture, pp. 83-94, Jun. 2000, ACM Press.

D. Burger et al., The simplescalar tool set, version 2.0. In University of Wisconsin-Madison Computer-Sciences Department Technical Report #1342, Jun. 1997.

D. Chiou et al., "Application-specific memory management for embedded systems using software-controlled caches", Proceedings of the 37th Design Automation Conference (DAC '00), Los Angeles, CA, Jun. 2000. ACM Press.

K. D. Cooper et al., "Compiler-controlled memory", Proceedings of the 8th International Confernece on Architectural Support for Programming Languages and Systems, Oct. 1998.

http://ftp.digital.com/pub/Digital/info/semiconductor/literature/cmpwrgd.pdf, "Compiler Writer's Guide for the Alpha 21264", Compaq Computer Corporation, 1999, Digital Equipment Corporation.

S. Furber et al., "ARM3-32b RISC processor with 4 KByte on-chip cache", Proceedings of the International Conferenece on VLSI, Elsevier, North Holland, Aug. 1989.

S. Furber et al., "Power saving features in Amulet2e", Power Driven Microarchitecture Workshop at 25th Annual International Symposium on Computer Architecture, Jun. 1998, Barcelona, Spain.

J. Heinrich, MIPS R10000 Microprocessor's User Manual, Second Edition.

J. Heinrich, MIPS R4000 Microprocessor User's Manual, Second Edition, MIPS Technologies, Inc. (1994).

Huang et al., "L1 Data Cache Decomposition for Energy Efficiency", ISLPED, pp. 10-15 ( 2001).

Inoue et al., "Way-Predicting Set-Associative Cache for High Performance and Low Energy Consumption", ISLPED99, pp. 273-275 (1999).

Kaxiras et al., "Cache Decay: Exploiting Generational Behavior to Reduce Cache Leakage Power", IEEE, pp. 240-251 (2001).

Kin et al., "The Filter Cache: An Energy Efficient Memory Structure", IEEE, pp. 184-193 (1997).

Lee et al., "MediaBench: A Tool for Evaluating and Synthesizing Multimedia and Communications Systems", pp. 330-335.

Manne et al., "Pipeline Gating: Speculation Control For Energy Reduction", IEEE, pp. 132-141 (1998).

Memik et al., "Selective Hardware/Compiler Approach for Improving Cache Locality", Dept. of Computer Science and Engineering, The Pennsylvania University, pp. 1-21.

Montanaro et al., "A 160-MHz, 32-b, 0.5-W CMOS RISC Microprocessor", The Journal of Solid-State Circuits, vol. 31, No. 11, pp. 1703-1714 (1996).

Moritz et al., "FlexCache: A Framework for Flexible Compiler Generated Data Caching", University of Massachusetts, Amherst, MA, M.I.T., Cambridge, MA.

Moritz et al., "Hot Pages: Software Caching for Raw Microprocessors", (1998), M.I.T., Cambridge, MA.

Pering et al., "Dynamic Voltage Scaling and the Design of a Low-Power Microprocessor System", .

Powell et al., "Reducing Set-Associative Cache Energy via Way-Prediction and Selective Direct-Mapping", IEEE, pp. 54-65 (2001).

Reinman et al., "An Integrated Cache Timing and Power Model", COMPAQ Western Research Lab, pp. 1-20 (1999).

Sair et al., "Memory Behavior of the SPEC2000 Benchmark Suite", IBM T.J. Watson Research Center, pp. 1-8.

Yang et al., "An Integratd Circuit/Architecture Approach to Reducing Leakage in Deep-Submicron High-Performance I-Caches", IEEE, pp. 147-157 (2001).

Zhang et al., "Highly-Associative Caches for Low-Power Processors", Kool Chips Workshop, 33$^{rd}$ International Symposium on Microarchitecture, (Dec. 2000), Monteray, CA.

Abraham et al., "Automatic and Efficient Evaluation of Memory Hierarchies for Embedded Systems", *Hewlett-Packard Laboratories*, Palo Alto, CA, (Undated).

Advanced Micro Devices, Inc., "Quantispeed™ Architecture", *AMD White Paper*, Sunnyvale, CA, (2001).

Anderson et al., "Physical Design of a Fourth-Generation POWER GHz Microprocessor", *Digest of Technical Papers, IEEE International Solid-State Circuits Conference*, pp. 232-233 and 451, (2001).

Bahar et al., "Power and Energy Reduction Via Pipeline Balancing", *IEEE*, 12 pgs., (2001).

Baniasadi et al., "Instruction Flow-Based Front-end Throttling for Power-Aware High-Performance Processors", (ISLPED '01), *ACM*, pp. 16-21, (2001).

Bechade et al., "A 32b 66MHz 1.8W Microprocessor", *Digest of Technical Papers, IEEE*, pp. 208-209, (1994).

Buyuktosunoglu et al., "An Adaptive Issue Queue for Reduced Power at High Performance" Power-Aware Computer Systems, First International Workshop, *PACS 2000*, pp. 25-39 (2000).

Calder et al. "Next Cache Line and Set Prediction." Proceedings of the 1995 International Computer Symposium on Computer Architecture, *ACM*, pp. 287-296 (1995).

Calder et al., "Fast & Accurate Instruction Fetch and Branch Prediction", *IEEE*, pp. 2-11 (1994).

Cantin et al., "Cache Performance for Selected SPEC CPU2000 Benchmarks" *Computer Architecture News*, 29(4):13-18 (2001).

Delaluz et al., "Energy-Oriented Compiler Optimizations for Partitioned Memory Architectures", Microsystems Design Laboratory, Pennsylvania State University, University Park, PA, 10 pps., (Undated).

Folegnani et al., "Energy-Effective Issue Logic", *IEEE*, 10 pgs. (2001).

Ghiasi et al., "Using IPC Variation in Workloads with Externally Specified Rates to Reduce Power Consumption", Univ. Colorado, Dept. of Computer Science, pp. 1-10 (Undated).

Gowan et al., "Power Considerations in the Design of the Alpha 21264 Microprocessor", (DAC 98), *ACM*, pp. 726-731 (1998).

Harvard University / Michael D. Smith's Research Group on Compilation and Computer Architecture; http://www.eecs.harvard.edu/hube/software/software.html.

Heinrich, J., *MIPS R10000 Microprocessor's User Manual*, 2nd Ed., MIPS Technologies, Inc. (1996).

Heinrich, J., *MIPS R4000 Microprocessor User's Manual*, 2nd Ed., MIPS Technologies, Inc. (1994).

Henry et al., "Circuits for Wide-Window SuperScalar Processors" (ISCA 3 00), *ACM*, pp. 236-247 (2000).

Hinton et al., "The Microarchitecture of the Pentium 4 Processor", *Intel Technology Journal* Q1, pp. 1-12 (2001).

Huang et al., "L1 Data Cache Decomposition for Energy Efficiency", (ISLPED'01), *ACM*, pp. 10-15 (2001).

Inoue et al., "Way-Predicting Set-Associative Cache for High Performance and Low Energy Consumption", (ISLPED'99), *ACM*, pp. 273-275 (1999).

Intel, "Intel® StrongARM* SA-1110 Microprocessor", *SA-1110 Brief Datasheet*, pp. 1-9 (2000).

International Search Report—PCT/US03/20999.

Jain et al., "A 1.2Ghz Alpha Microprocessor with 44.8GB/s Chip Pin Bandwidth", *IEEE*, pp. 240-241 (2001).

Kever et al., "A 200MHz RISC Microprocessor with 128kB On-Chip Caches", *IEEE*, pp. 410, 411 and 495 (1997).

Kowalczyk et al., "First-Generation MAJC Dual Processor", *IEEE*, pp. 236-237 and 451 (2001).

Kulkarni et al., "Advanced Data Layout Optimization for Multimedia Applications", IMEC, 8 pps. (undated).

Lam et al., "Limits of Control Flow on Parallelism", *ACM*, pp. 46-57 (1992).

Larsen et al., "Exploiting Superword Level Parallelism With Multimedia Instruction Sets", (PLDI'00), *ACM*, pp. 145-156 (2000).

Lee et al., "Region-Based Caching: An Energy-Delay Efficient Memory Architecture for Embedded Processors." (CASES '00) *ACM*, pp. 120-127 (2000).

Lee et al., "MediaBench: A Tool for Evaluating and Synthesizing Multimedia and Communications Systems", UCLA, pp. 330-335 (Undated).

Leenstra et al., "A 1.8 GHz Instruction Buffer", *IEEE*, pp. 314-315 and 459 (2001).

Marculescu, D., "Profile-Driven Code Execution for Low Power Dissipation", (ISPLED'00) *ACM*, pp. 253-255 (2000).

Maro et al., "Dynamically Reconfiguring Processor Resources to Reduce Power Consumption in High-Performance Processors, Workshop on Power-Aware Computer Systems", (PACS '00/LNCS 2008) *ACM*, pp. 97-111 (2001).

Memik et al., "A Selective Hardware/Compiler Approach for Improving Cache Locality", Center for Parallel and Distributed Computing, Northwestern University; pp. 1-21 (Undated).

Michaud et al. "Data-Flow Prescheduling for Large Instructions Windows in Out-of-Order Processors, 7th International", *IEEE*, pp. 2736 (2001).

Milutinovic et al., "The Split Temporal/Spatial Cache: Initial Performance Analysis", Proceedings of the SCIzzL-5, 8 pps. (1996).

Montanaro et al., "A 160 MHz, 32b, 0.5-W CMOS RISC Microprocessor", *IEEE*, 31(11):1703-1714 (1996).

Moritz et al., "Hot Pages: Software Caching for Raw Microprocessors", International Symposium for Computer Architecture (ISCA-27), Massachusetts Institute of Technology, Cambridge, MA, pp. 1-12 (1999).

Moritz et al., "FlexCache: A Framework for Flexible Compiler Generated Data Caching", Umass / MIT, 13 pps. (undated).

Nicolau et al., "Measuring the Parallelism Available for Very Long Instruction Word Architectures", *IEEE Transactions on Computers*, 33(11):968-976 (1984).

Palacharla et al., "Complexity-Effective Superscalar Processors", (ISCA'97) *ACM*, pp. 206-218 (1997).

Panda et al., "Efficient Utilization of Scratch-Pad Memory in Embedded Processor Applications", *IEEE*, pp. 7-11 (1997).

Parikh et al., "Power Issues Related to Branch Prediction", (HPCA'02) *IEEE*, 12 pgs. (2002).

Pering et al., "Dynamic Voltage Scaling and the Design of a Low-Power Microprocessor System", UC Berkeley, Electronics Research Laboratory, (Undated).

Ponomarev et al., "Reducing Power Requirements of Instruction Scheduling Through Dynamic Allocation of Multiple Datapath Resources", *IEEE*, pp. 90-101 (2001).

Postiff et al., "The Limits of Instructions Level Parallelism In SPEC95 Applications", Adv. Computer Architecture Lab, UMichigan, 10 pgs. (undated).

Ranganathan et al., "Reconfigurable Caches and their Application to Media Processing", (ISCA'00) *ACM*, pp. 214-224 (2000).

Sair et al., "Memory Behavior of the SPEC2000 Benchmark Suite", IBM T. J. Watson Research Center, pp. 1-8 (undated).

Schlansker et al., "Achieving High Levels of Instruction-Level Parallelism with Reduced Hardware Complexity", Hewlett Packard Laboratories (HP-96-120), pp. 1-85 (1994).

Sohi et al., "Instruction Issue Logic for High-Performance, Interruptable Pipelined Processors", *ACM*, pp. 27-34 (1987).

Stanford University SUIF Compiler Group—http://suif.stanford.edu/.

The Standard Performance Evaluation Corporation, http://www.spec.org. (© 2002).

Tune et al., "Dynamic Predictions of Critical Path Instructions", *IEEE*, pp. 185-195 (2001).

Wall, David W., "Limits of Instruction-Level Parallelism", *ACM*, pp. 176-188 (1991).

Weber "Hammer: The Architecture AMD's of Next-Generation Processors", Microprocessor Forum, (2001).

Wilton et al., "CACTI: An Enhanced Cache Access and Cycle Time Model", *IEEE—Journal of Solid-State Circuits*, 31 (5):677-688 (1996).

Witchel, E., "Direct Addressed Caches for Reduced Power Consumption", *IEEE*, pp. 124-133 (2001).

Yang et al., "An Integrated Circuit/Architecture Approach to Reducing Leakage in Deep-Submicron High-Performance I-Caches", *IEEE*, pp. 147-157 (2001).

Zhang et al., "Highly-Associative Caches for Low-Power Processors", *Kool Chips Workshop, 33rd Internaitonal Symposium on Microarchitecture*, 6 pgs. (2000).

Zyuban et al., "Inherently Lower-Power High-Super-Performance Superscalar Architectures", *IEEE Transactions on Computers*, 50(3):268-285 (2001).

International Preliminary Examinatino Report in application PCT/US03/21076, mailed Sep. 16, 2004.

Aragon, et al., "Power-aware Control Speculation Through Selective Throttling," *Proceedings of 9th International Symposium on High Performance Computer Architecture (HPCA)*, 2003.

Ashok, et al., "Coupling Compiler-Enabled and Conventional Memory Accessing for Energy Efficiency," *ACM Transactions on Computer Systems*, 22(2):180-213 (2004).

Unsal, et al., "Cool-Fetch: Compiler-Enabled Power-Aware Fetch Throttling," *IEEE Computer Architecture Letters*, vol. 1, 2002.

Unsal, et al., "Cool-Fetch: A Compiler-Enabled IPC Estimation-Based Framework for Energy Reduction," *Interact-8*, Feb. 2004.

Unsal, et al., "Cool Cache: A Compiler-Enabled Energy Efficient Data Caching Framework for Embedded / Multimedia Processors," *ACM Transactions on Embedded Computing Systems*, 2(3):373-392 (2003).

Unsal, et al., "An Analysis of Scalar Memory Accesses in Embedded and Multimedia Systems," *High Performance Memory Systems*, Springer-Verlag, 2003.

Unsal, et al., "The Minimax Cache: An Energy Efficient Framework for Media Processors," *IEEE*, pp. 131-140 (2002).

Michael D. Smith, /home/mds/software, http://www.eecs.harvard.edu/hube/software/software.html, 1999, 2 pages.

The Stanford SUIF Compiler Group, The SUIF Group, http://suif.stanford.edu/, printed Mar. 30, 2007, 2 pages.

F. Jesus Sanchez, et al., Static Locality Analysis for Cache Management, 1997, pp. 261-271.

Nikolaos E. Bellas, et al., Using Dynamic Cache Management Technique to Reduce Energy in General Purpose Processors, 2000, pp. 693-708.

\* cited by examiner

REDUCING PROCESSOR ENERGY CONSUMPTION USING COMPILE-TIME INFORMATION

TECHNICAL FIELD

This invention relates generally to reducing energy consumption in a microprocessor and, more particularly, to reducing energy consumption by directing memory accesses based on compile-time information.

BACKGROUND

Microprocessors (referred to herein simply as "processors") consume energy during their operation. It is advantageous to reduce the amount of energy consumed, particularly in the case of devices that run off of limited power supplies.

Various factors affect the amount of energy that a processor consumes. For example, the frequency at which the processor operates and the size of the voltage supply that powers the processor contribute to processor energy consumption. Reducing the frequency of the processor or the voltage supply may decrease processor energy consumption, however, doing so may also adversely affect the performance of the processor.

Accordingly, there exists a need for a way of reducing processor energy consumption that does not have a significant adverse affect on the processor's performance. The reductions in energy consumption should also be scaleable, meaning that they can be implemented on processors having different architectures.

SUMMARY

The processor framework described herein address the foregoing need by providing energy savings without significant adverse affects on performance. The framework does this by utilizing static and statically speculative compile-time information to map certain data accesses to a mini-buffer or mini-cache, respectively. The mini-buffer and mini-cache require less energy to access than a conventional cache. As a result, processors using this framework require less energy per memory access and, therefore, less energy to operate. Furthermore, the framework is applicable to processors having different architectures and is therefore scaleable.

The invention can be used to save energy on any type of device that includes a processor. For example, the invention can be used to save energy on personal computers, devices containing embedded controllers, and hand-held devices, such as PalmPilots and cellular telephones.

In general, in one aspect, the invention is directed to a method, for use in a processor, which includes mapping a first data access having less than a predetermined memory footprint to a first memory area, and mapping a second data access having greater than the predetermined memory footprint to a second memory area. This aspect may include one or more of the following features.

The method may include identifying the first data access using static compile-time information and/or estimating the first data access using speculative static compile time information. Estimating the first data access may include examining an intermediate representation of computer code that is generated during compiling to identify data accesses that are most likely to occur during execution of the code. A control flow graph of the intermediate representation may be examined to determine the data accesses that are most likely to occur.

The first memory area may be a mini-buffer, a mini-cache, a register, and/or a partition of a standard cache. The second memory area may be a standard cache, a mini-cache, a mini-buffer, and/or a remaining portion of a partitioned cache. The first data access may be a scalar data access. The first memory area may require less energy to access than the second memory area. The first memory area may be smaller than the second memory area.

The method may include compiling computer code, inserting annotations into an intermediate representation of the computer code generated during compiling, propagating the annotations from the intermediate representation to a low-level representation of the computer code generated during compiling, and inserting instructions into the low-level representation. The instructions may control mapping of the first data and the second data. The method may also include estimating a memory footprint of the first data access. The estimating process may include isolating the data access in a computer program, determining a granularity of the data access by performing an instruction analysis, and identifying the memory footprint by counting multiple accesses into a same memory location and by taking a maximum of granularities of the multiple data accesses.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In addition, the materials, methods, and examples are illustrative only and not intended to be limiting.

Other features and advantages of the invention will become apparent from the following description, including the claims and drawings.

DESCRIPTION

In the embodiments described herein, a processor framework leverages (i.e., uses) static and speculative static compile-time information to reduce energy consumption. The processor framework also leverages the fact that some types of data have relatively small memory footprints (i.e., the data occupies relatively little memory) and are accessed frequently. Data accesses with footprints that meet these criteria are identified using compile-time information and mapped differently than data accesses with relatively large footprints that are accessed less frequently.

Figure 1:
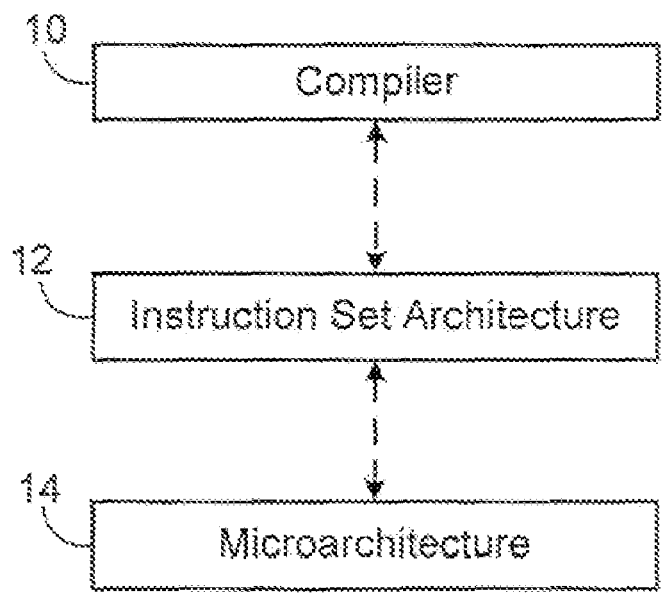
FIG. 1 is a block diagram showing the relationship between a compiler, instruction set architecture, and microarchitecture in a processor.

Referring to FIG. 1, a compiler 10 is a software system that programs circuitry to translate applications from high-level programming languages (e.g., C, C++, JAVA®) into machine specific sequences of instructions. An instruction set architecture (ISA) 12 is a set of rules that defines the encoding of operations into machine specific instructions.

The ISA acts as the interface between compiler 10 and the microarchitecture (14). A computer program is a collection of machine level instructions that are executed to perform a desired functionality. Micro-architectural (or architectural) components 14 comprise primarily hardware and/or software techniques that are used during execution of the program. The actual machine can be a microprocessor or any other device that is capable of executing instructions that conform to the encoding defined in the ISA.

Compile-time refers to the time during which the program is translated from a high-level programming language into a machine-specific stream of instructions, and it is not part of execution or runtime. Runtime is the time it takes to execute translated machine instructions on the machine. Compilation is typically performed on a different host machine than execution.

Information collected during compilation is called static or compile-time information. Program analyses are performed during compile-time to analyze the program and extract static information. Program transformations (or optimizations) are performed during compile-time to modify the program typically to achieve some objective such as improvement in performance.

Static information is predictable if it can be shown during compilation that the information is true for any possible input set applied to the program, or for any possible execution of the program on the machine in question. Static information is speculative if the information extracted during compile-time is not shown or cannot be shown to be true for all possible execution instances. As such, the available (i.e., extractable) speculative static information is a superset of the available predictable static information in a program.

The processes described herein combine architecture and compiler techniques into a compiler-enabled, tightly integrated, compiler-architecture based system design. An approach is deemed compiler-enabled if the execution of specific instructions is managed to some extent by static information. This is beneficial, since static and static-dynamic energy reduction optimizations can be enabled.

A cache is a fast memory hierarchy layer, typically smaller in size than a physical address space. It is one of the cornerstones of computer systems, and is used to hide the latency of main memory accessing. This is especially important, due to the increasing gap between execution speeds and memory latency. While execution speeds are said to double every 18 months (Moore's law), memory latencies are improving at a much lower rate. With the increasing cache sizes, which are necessary to hide memory latencies, the energy impact of cache accesses becomes even more significant in processor designs.

Using Static Information

In one embodiment, the processor framework uses a statically managed conventional cache (e.g., an L1 cache) and a mini-buffer, although more than one cache and one mini-buffer may be used. The mini-buffer may be small in size, e.g., 1 KiloByte (KB), 2 KB, or the like, relative to the conventional cache. It is noted, however, that the invention is not limited to use with a mini-buffer of these sizes; any size mini-buffer may be used.

In other embodiments, two or more mini-buffers may be used. These multiple mini-buffers may be differently sized to handle different types of data accesses. The compiler may coordinate access to the different mini-buffers. Conventional L1 and/or L2 caches may also be used in combination with the multiple mini-buffers, as above.

The processor analyzes static information (i.e., information that is obtained when a program is compiled) to map data accesses with relatively small memory footprints (e.g., on the order of 1 KB) to the mini-buffer and to map all other data accesses to the conventional cache. This is considered a conservative approach, since it uses a "worst case" estimate for every data access in a compiled program. That is, if a data access cannot be disambiguated at compile time, the processor assumes a maximum memory footprint for that data access (i.e., a footprint that is guaranteed to accommodate that data access), and maps the data access to either the mini-buffer or the conventional cache based on the assumed footprint.

Figure 2:
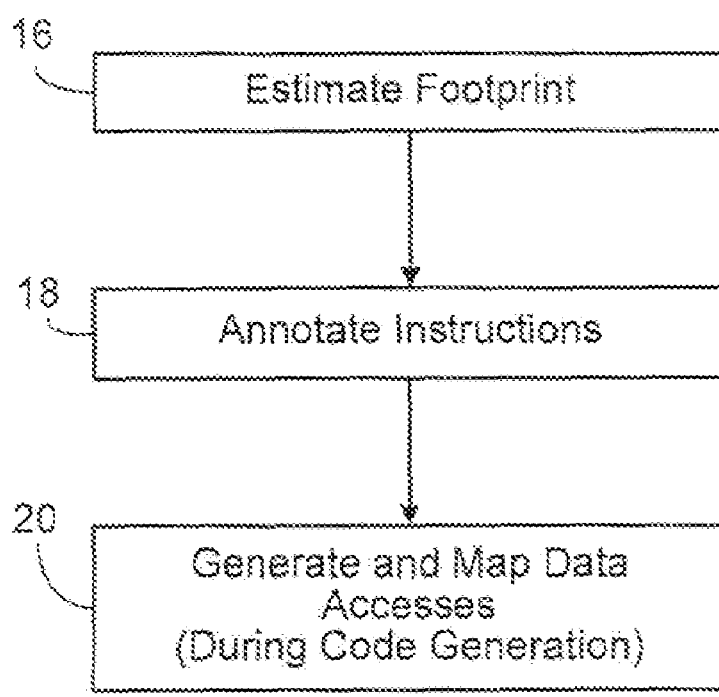
FIG. 2 is a flowchart showing a data access mapping process according to the present invention.

Referring to FIG. 2, the memory footprint of a block of computer code may be estimated (16) during compiling. This is done by breaking the code down into constituent blocks. The data accesses associated with each block may be identified and their sizes determined during compilation.

The compiler may estimate a data access footprint using a number of methods. In this embodiment, the compiler isolates pre-specified (e.g., scalar) data accesses in each routine or block of a program. The compiler determines the granularity of the data by performing an instruction analysis to identify types of operands in the instructions the type of the instructions. For example, the granularity may be eight if the move is a quadword instruction, two if it is a word instruction, and so on. The compiler then identifies the footprint of the data accesses by counting multiple accesses into the same memory location only once and by taking the maximum of the granularities of those data accesses.

Once the compiler identifies the memory footprints, the compiler annotates (18) the blocks of instructions, as described in more detail below, with instructions from the ISA that tell circuitry in the processor (e.g., the microarchitecture) where to map (28) the data accesses. The compiler also may perform a reuse analysis on a data access to ensure that the sum of memory footprints for a data access during different parts of execution does not exceed the size of the mini-buffer.

Since the processor uses static compile-time information and maps all data accesses conservatively, the mappings will be correct. The processor will map all data accesses that fit into the mini-buffer to the mini-buffer, and all data accesses that do not fit into the mini-buffer to the cache. This approach results in energy savings, since the mini-buffer requires less power to access than does the conventional cache. However, even further energy savings can result from using "speculative" information (defined below) to perform the data access mapping.

Using Speculative Static Information

Another processor architecture uses a mini-cache in place of the mini-buffer, and one or more conventional caches. Like the mini-buffer, the mini-cache may be on the order of 1 KB or 2 KB; however, any size mini-cache may be used. This architecture uses speculative static compile-time information to determine where (e.g., the mini-cache or the conventional cache) to map data accesses. The overall process is the same as that shown in FIG. 2.

In this context, speculative static compile-time information identifies the data accesses that are most likely to occur during execution of a program. Data access footprints are estimated speculatively using the speculative static compile-time information. The speculative static compile-time information is used later to make decisions about data mapping. The compiler may estimate (16) the footprints of data accesses in the manner described above and annotate (18) the data accesses. The annotations are used during mapping, as above.

The compiler analyzes the program to extract information speculatively. The information is used in mapping low-footprint data accesses to the mini-cache and others to the conventional cache. As part of the estimation process (16), the compiler determines which data accesses are most likely to occur, as described below. The data access footprints do not need to be determined conservatively, as in the mini-buffer case, since the compiler will determine the most likely footprint for each data access and the data access will be generated and mapped (20) accordingly by the appropriate hardware.

In one embodiment, this estimation process includes partitioning a program into its basic blocks, resulting in an intermediate representation of the program. The compiler examines the source code and every procedure call within the source code to build a control flow graph. Using this graph, the compiler determines which data accesses with an estimated small memory footprint (e.g., 1 KB, 2 KB or thereabouts) are most likely to occur most frequently during execution of the program.

The determination of which data accesses are most likely to occur may be made, e.g., by following branches of the control flow graph noted above. For instance, a loop in a program may contain a data accesses which is most often 1 KB or less and which, in one case, is greater than 1 KB. The compiler will insert an instruction from the ISA in an instruction stream (see below) for the program to map that data access to the mini-cache, since it is most likely that the data access will be 1 KB or less. This is what is meant by estimating the size of the data access and using that information speculatively, i.e., the exact value of the data access at all points during execution need not be used to map the data access, only the most likely value of that data access may be used to map the data access.

Thus, the compiler identifies the data accesses from speculative static compile-time information and the microarchitecture maps data accesses with less than a predetermined estimated memory footprint (e.g., less than 1 KB), which are likely to occur most frequently, to the mini-cache and all other data accesses to the conventional cache. The mini-cache may be sized to accommodate such data accesses.

Improperly mapping some data accesses to the mini-cache should not have a significant adverse affect on the processor's performance or energy consumption, particularly in view of the energy saving resulting from mapping certain data accesses to the mini-cache. If data accesses are mapped improperly, other memory layers, such as an L2 cache, may accommodate those data accesses.

In other embodiments, two or more mini-caches may be used. These multiple mini-caches may be differently sized to handle different types of data accesses. The compiler may coordinate access to the different mini-caches. There are no limits to the sizes and numbers of mini-caches that may be used. Conventional L1 and/or L2 caches may be used in combination with the multiple mini-caches, as above.

Instead of using separate caches, a single cache may be partitioned, such that a portion of the cache acts as an effective mini-cache. The compiler can select the size of the partition dynamically, thereby changing the size of the effective mini-cache on a per program basis, if desired. As above, the compiler can map frequent data accesses with small memory footprints to the effective mini-cache and other data accesses to the remainder of the cache. The partitioned cache can be hardware controlled as well.

Mapping Data Accesses

The same basic processes may be used to map data accesses for the static and the speculative static approaches described above.

An instruction set architecture acts as the interface between the compiler and the processor's microarchitecture. At the beginning of compilation, a program contains high level structures, such as loops, data structures, and the like. Closer to the end of compilation, the program is translated into a low-level (machine-language-like) code that contains branches, conditional branches, memory instructions, register level operators, and the like.

During code generation, the compiler inserts instructions into the instruction stream to indicate the cache to which each data access is directed. In more detail, the compiler makes numerous passes through the code, in the process performing different types of analyses and optimizations on the code. During these passes, the compiler obtains various intermediate representations of the code and annotates these representations. An annotation is a marker or the like that is inserted into the code. The annotations correspond to memory footprints of various blocks of the code determined, as described above. These annotations are propagated down from the high-level code at the beginning of compilation to the low-level code resulting near the end of compilation.

Near the end of compilation, the code generator inserts instructions from the given instruction set at the locations corresponding to the annotations. These instructions direct data accesses for the annotated code to either the mini-cache (or mini-buffer) or the conventional cache depending upon their memory footprint, as described above. If more than one mini-cache, mini-buffer, or cache is used, the instructions direct the data accesses to the appropriate memory areas.

Register Accesses

The mini-cache may be used to accommodate scalar accesses that otherwise would have been mapped to the processor's registers. Following code generation, the compiler makes another pass over the code. This other pass is used for register allocation. The register allocation process decides which of the scalar types of data accesses are going to be mapped to physical registers and which are going to be mapped to the mini-cache (or mini-buffer) or the conventional cache.

During register allocation, a global optimization may be performed on the compiled code to determine which scalar types of data accesses to map to registers, which register accesses to map to the mini-cache (or mini-buffer), and which scalar types of data accesses to map to the conventional (e.g., L1 or L2) cache. To determine which accesses to map to the registers, a reuse analysis may be performed. A reuse analysis includes examining the life cycle and frequency of use of a scalar to determine if that scalar may or may not be mapped to a register.

Sample Implementation

Thus, in the processor framework described herein, some of the processor's data accesses are performed via the mini-cache (or mini-buffer) and some of the data accesses are performed via the conventional cache. Typically, relatively small, frequent data accesses are mapped to the mini-cache (or mini-buffer) and larger, less frequent data accesses are mapped to the conventional cache. Taking multimedia applications (e.g., applications with audio and video components) as an example, scalar accesses may be identified and mapped to the mini-cache (or mini-buffer), since scalars have a relatively small memory footprint and are accessed frequently in multimedia applications.

In this context, a "scalar" is a singular value, meaning a value that is not part of a larger construct, such as an array or a vector. Scalars may be program variables, such as integers or the like and generally contain one or two words (although they are not limited as such). Scalars also may be compiler-generated variables, such as intermediate variables generated by the compiler during compilation of a program.

Figure 3:
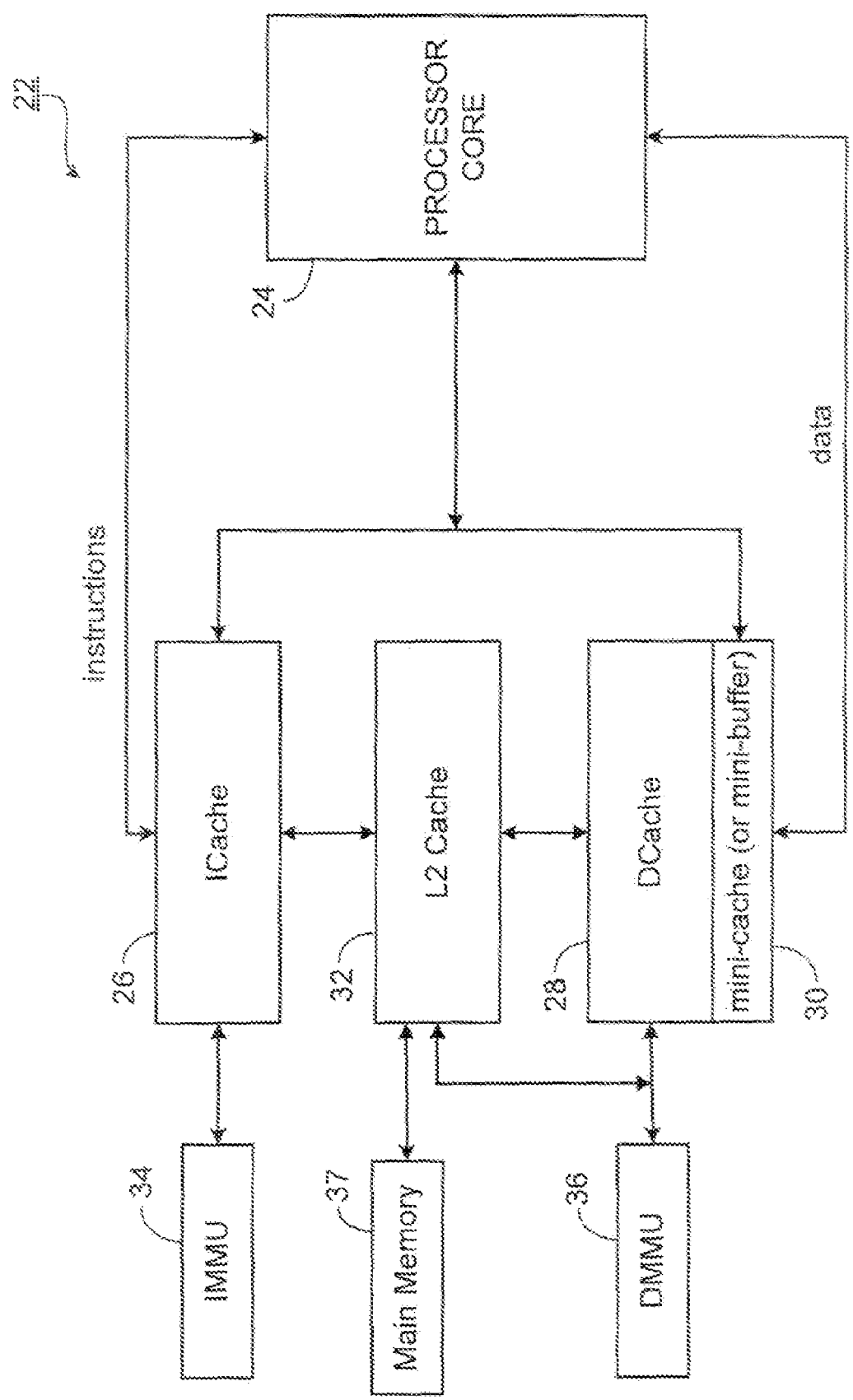
FIG. 3 is a block diagram of processor architecture on which the invention may be implemented.

FIG. 3 shows the architecture of a media processor on which the mini-cache/mini-buffer framework may be implemented. In this context, a media processor is a microprocessor that is capable of executing multimedia applications.

Generally speaking, architectural modifications to a media processor are not required if the processor is already equipped with a scratch-pad memory or some other small memory area that can be used as a mini-cache (or mini-buffer). If the processor is not equipped with a memory that can be used as a mini-cache, then the compiler can be used to devise special load/store instructions which channel the scalar data to a separate, smaller cache area of the processor.

In the embodiment of FIG. 3, the processor 22 includes a core 24 containing logic (circuitry) for executing instructions, a conventional (standard) instruction cache (Icache 26), a conventional (standard) data cache (Dcache 28), and a scratchpad memory 30 that may be used as part of the mini-cache/mini-buffer framework. An L2 cache 32 and main memory 37 may also be included in the architecture, as shown in FIG. 3. Instruction memory management unit (IMMU) 34 contains logic (circuitry) that controls access to Icache 26 and data memory management unit (DMMU 36) contains logic (circuitry) that controls access to Dcache 28 and L2 cache 32. Buses (not labeled) provide paths over which data and/or instructions are transported between the components of processor 10. A mini-cache of 128 bytes can hold a working set of scalar data for most multimedia applications, although mini-caches that are smaller or larger than 128 bytes may be used, as noted below.

It is noted that the processor framework described herein is not limited to use with multimedia applications, to use with scalars, or to use with the architecture of FIG. 3. The framework may be used with any application and with any type of data access.

Other embodiments not described herein are also within the scope of the following claims.

What is claimed is:

1. A method for use in a processor that is configured to execute a computer program, comprising:
    estimating a memory footprint of a data access associated with execution of the computer program, where estimating is performed using speculative static compile time information, the speculative static compile time information identifying the data access as one that is more likely to occur during the execution of the computer program than other data accesses but that need not occur;
    mapping the data access to a first memory area if the memory footprint is less than or equal to a predetermined size; and
    mapping the data access to a second memory area if the memory footprint is greater than the predetermined size, the second memory area comprising a standard cache, the standard cache having a size that is greater than a size of the first memory area.

2. The method of claim 1, wherein estimating the memory footprint comprises examining an intermediate representation of computer code for the computer program that is generated during compiling.

3. The method of claim 1, wherein a control flow graph of the intermediate representation is examined to determine data accesses that are most likely to occur.

4. The method of claim 1, wherein the first memory area comprises a mini-buffer.

5. The method of claim 1, wherein the first memory area comprises a mini-cache.

6. The method of claim 1, wherein the first memory area comprises a register.

7. The method of claim 1, wherein:
    the first memory area comprises a partitioned portion of the standard cache; and
    the second memory area comprises a remaining portion of the standard cache.

8. The method of claim 1, wherein the data access comprises a scalar data access.

9. The method of claim 1, wherein the first memory area requires less energy to access than the second memory area.

10. The method of claim 1, further comprising:
    compiling computer code for the computer program;
    inserting annotations into an intermediate representation of the computer code generated during compiling;
    propagating the annotations from the intermediate representation to a low-level representation of the computer code generated during compiling; and
    inserting instructions into the low-level representation, the instructions controlling mapping of the data access.

11. The method of claim 1, wherein estimating the memory footprint of the data access comprises:
    isolating the data access in the computer program;
    determining a granularity of the data access by performing an instruction analysis; and
    identifying the memory footprint by counting multiple accesses into a same memory location and by taking a maximum of granularities of the multiple data accesses.

12. A processing system comprising:
    a first memory area;
    a second memory area, the second memory area comprising a standard cache, the standard cache having a size that is greater than a size of the first memory area; and
    circuitry to:
        estimate a memory footprint of a data access associated with execution of the computer program, where estimating is performed using speculative static compile time information, the speculative static compile time information identifying the data access as one that is more likely to occur during the execution of the computer program than other data accesses but that need not occur;
        map the data access to the first memory area if the memory footprint is less than or equal to a predetermined size; and
        map the data access to the second memory area if the memory footprint is greater than the predetermined size.

13. The processing system of claim 12, wherein estimating the memory footprint comprises examining an intermediate representation of computer code for the computer program that is generated during compiling.

14. The processing system of claim 12, wherein a control flow graph of the intermediate representation is examined to determine data accesses that are most likely to occur.

15. The processing system of claim 12, wherein the first memory area comprises a mini-buffer.

16. The processing system of claim 12, wherein the first memory area comprises a mini-cache.

17. The processing system of claim 12, wherein the first memory area comprises a register.

18. The processing system of claim 12, wherein:
the first memory area comprises a partitioned portion of the standard cache; and
the second memory area comprises a remaining portion of the standard cache.

19. The processing system of claim 12, wherein the data access comprises a scalar data access.

20. The processing system of claim 12, wherein the first memory area requires less energy to access than the second memory area.

21. The processing system of claim 12, further comprising circuitry to:
compile computer code for the computer program;
insert annotations into an intermediate representation of the computer code generated during compiling;
propagate the annotations from the intermediate representation to a low-level representation of the computer code generated during compiling; and
insert instructions into the low-level representation, the instructions controlling mapping of the data access.

22. The processing system of claim 12, wherein estimating the memory footprint of the data access comprises:
isolating the data access in the computer program;
determining a granularity of the data access by performing an instruction analysis; and
identifying the memory footprint by counting multiple accesses into a same memory location and by taking a maximum of granularties of the multiple data accesses.

* * * * *